United States Patent Office 3,509,198
Patented Apr. 28, 1970

3,509,198
PREPARATION OF 2-CHLOROCARBONYL-PHENYLISOCYANATES
Engelbert Kuehle and Erich Klauke, Cologne-Flittard, Germany, assignors to Farbenfabriken Bayer Aktiengesellschaft, Leverkusen, Germany, a corporation of Germany
No Drawing. Filed Mar. 28, 1967, Ser. No. 626,385
Claims priority, application Germany, Apr. 20, 1966, F 48,971
Int. Cl. C07c *119/04;* A01n *9/22*
U.S. Cl. 260—453       3 Claims

ABSTRACT OF THE DISCLOSURE 2-chlorocarbonyl-phenylisocyanates useful to prepare herbicides and insecticides are prepared by reacting 2-formylaminobenzoic acid lower alkyl esters with chlorine or sulphuryl chloride in thionyl chloride at 0° C. to 50° C. to prepare orthoisocyanide dichloride benzoic acid esters which then undergo direct conversion to 2-chlorocarbonyl-phenylisocyanates at an elevated temperature of 100° C. to 200° C.

---

This invention relates to phenyl isocyanates and more particularly to acyl chloride derivatives of phenylisocyanates where the acyl chloride group is ortho to the isocyanato group and a process for the preparation thereof.

It has been proposed heretofore in German Patent 500,-916 to react ortho aminobenzoic acid with phosgene. The reaction does not produce an isocyanate but instead a cyclic compound results. For example, if orthoaminobenzoic acid is reacted with phosgene, isatoic anhydride is formed:

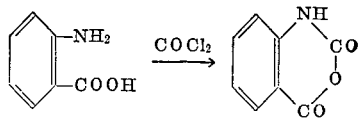

It has also been proposed heretofore in Ang. Chem. 74, 861–866 (1962) to react 4-formylaminobenzoic acid methyl ester with sulphuryl chloride in thionyl chloride to prepare the corresponding isocyanide dichloride:

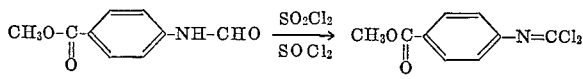

Thus, it has not been possible heretofore to prepare phenyl isocyanates with an acyl chloride group ortho to the —NCO group because direct phosgenation produces a cyclic compound.

It is, therefore, an object of this invention to provide 2-chlorocarbonyl-phenylisocyanates and a process for the preparation thereof. Another object of this invention is to provide an improved process for obtaining isocyanates which are useful as intermediates to prepare herbicides, insecticides and the like. A further object of this invention is to provide an improved process for the preparation of acyl chlorophenylisocyanates.

The foregoing objects and others which will become apparent from the following description are accomplished in accordance with this invention, generally speaking, by providing compounds having the formula:

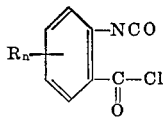

wherein $n$ is 0 to 4 and R is halogen, such as chlorine, bromine or fluorine, lower alkyl such as methyl, ethyl, propyl, butyl and the like or alkoxy such as methoxy, ethoxy, propoxy, butoxy and the like and a process for the preparation thereof wherein a 2-formylaminobenzoic acid alkyl ester is reacted with chlorine or sulphuryl chloride in thionyl chloride at a temperature in the range of from about 0° C. to about 50° C. until an orthoalkoxycarbonyl phenyl isocyanide dichloride is formed and then heating the reaction mixture at a temperature of about 100° C. to about 200° C. so that a direct conversion of the isocyanide dichloride to a 2-chlorocarbonylphenylisocyanate takes place. It is believed that the reaction involves an intra-molecular exchange of chlorine and oxygen so that it could be illustrated by the following reaction scheme:

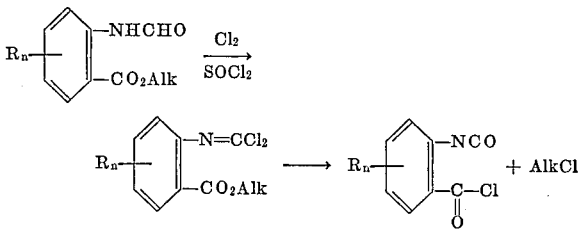

In the foregoing formula R and n have the meanings set forth above, Alk denotes a lower alkyl radical such as methyl, ethyl, propyl or butyl and is preferably a methyl radical. "Lower alkyl" throughout this application refers to radicals having 1 to 4 carbon atoms.

Any suitable formylaminobenzoic acid ester may be used to prepare the 2-chlorocarbonyl-phenylisocyanates of the invention such as, for example, 2-formylaminobenzoic acid methyl ester, 2-formylaminobenzoic acid ethyl ester, 2-formylaminobenzoic acid n-propyl ester, 2-formylaminobenzoic acid n-butyl ester, 4-chloro-2-formylaminobenzoic acid methyl ester, 4-chloro-2-formylaminobenzoic acid ethyl ester, 4-chloro-2-formylaminobenzoic acid n-propyl ester, 4-chloro-2- formylaminobenzoic acid n-butyl ester, 5-chloro-2-formylaminobenzoic acid methyl ester, 5-chloro-2-formylaminobenzoic acid ethyl ester, 5-chloro-2-formylaminobenzoic acid n-propyl ester, 5-chloro-2-formylaminobenzoic acid n-butyl ester, 3,5-dichloro-2-formylaminobenzoic acid methyl ester, 3,5-dichloro-2-formylaminobenzoic acid ethyl ester, 3,5-dichloro-2-formylaminobenzoic acid n-propyl ester, 3,5-dichloro-2-formylaminobenzoic acid n-butyl ester, 4-methyl-2-formylaminobenzoic acid methyl ester, 4-methyl-2-formylaminobenzoic acid n-propyl ester, 4-methyl-2-formylaminobenzoic acid n-butyl ester, 4-butyl-2-formylaminobenzoic acid methyl ester, 4-butyl-2-formylaminobenzoic acid ethyl ester, 4-butyl-2-formylaminobenzoic acid n-propyl ester, 4-butyl-2-formylaminobenzoic acid n - butyl ester, 4 - methoxy-2-formylaminobenzoic acid methyl ester, 4-methoxy-2-formylaminobenzoic acid ethyl ester, 4 - methoxy - 2-formylaminobenzoic acid n-propyl ester, 4 - methoxy - 2 - formylaminobenzoic acid n-butyl ester, 4-butoxy-2-formylaminobenzoic acid methyl ester, 4-butoxy-2-formylaminobenzoic acid ethyl ester, 4-butoxy-2-formylaminobenzoic acid n-propyl ester, 4-butoxy-2-formylaminobenzoic acid n - butyl ester, 3-chloro-5-ethoxy-2-formylaminobenzoic acid methyl ester, 3-chloro-5-ethoxy-2-formylaminobenzoic acid ethyl ester, 3-chloro-5-ethoxy-2-formylaminobenzoic acid n-propyl ester, 3-chloro-5- ethoxy-2-formylaminobenzoic acid n-butyl ester, 3,6 - dichloro-4-methoxy-5-methyl-2-formylaminobenzoic acid methyl ester, 3,6-dichloro-4-methoxy-5-methyl-2-formylaminobenzoic acid ethyl ester, 3,6-dichloro-4-methoxy-5-methyl-2-formylaminobenzoic acid n-propyl ester, 3,6 - dichloro - 4-methoxy-5-methyl-2-formylaminobenzoic acid n-butyl ester, 4-bromo-2-formylaminobenzoic acid methyl ester, 4-bromo-2-formylaminobenzoic acid ethyl ester, 4-bromo-2-formylaminobenzoic acid n-propyl ester, 4-bromo-2-formylaminobenzoic acid n-butyl ester, 4-fluoro-2-formylaminobenzoic acid methyl ester, 4-fluoro-2-formylaminobenzoic acid ethyl ester, 4-fluoro-2-formylaminobenzoic acid n-propyl ester, 4-fluoro-2-formylaminobenzoic acid n-butyl ester. The formylamino compounds can be obtained in known manner by the formulation of 2-aminobenzoic acid esters, i.e. by reaction thereof with formic acid. This is a known reaction.

In accordance with the process of the invention it is preferred to use an excess of thionyl chloride and to add the 2-formylaminobenzoic acid ester which corresponds to the 2-chlorocarbonyl-phenylisocyanate to be prepared to the thionyl chloride in a reaction vessel at a temperature of 0 to 50° C. and preferably from 10 to 30° C. Chlorine is then introduced to chlorinate the ester. Alternately, the ester may be introduced into a mixture of sulphuryl chloride and thionyl chloride. The second stage of the reaction is carried out by heating the reaction mixture to a temperature of about 100 to about 200° C. This heating step will also remove excess thionyl chloride by distillation of the alkyl chloride which is formed in the direct conversion reaction. The distillation reaction may be carried out in a solvent and the distillation is preferably carried out under a vacuum and also in a solvent. Suitable solvents are any which are inert to the reactants and the product and which are of sufficiently high boiling point such as, for example, chlorobenzene, dichlorobenzene and the like. The time that the second heating is carried out depends on the extent of the recovery of the product which is desired and the purity which is desired. The distillation is usually carried out until substantially all of the alkyl chloride formed in the direct conversion has been removed.

The new compounds of the invention are valuable intermediate products for the production of synthetic resins, pesticides or herbicides. Thus it is possible to react the 2-chlorocarbonyl-phenylisocyanates with ammonia or a primary amine to prepare 24 - dioxo-tetrahydroquinazolines which have herbicidal properties.

The invention is further illustrated by the following examples in which the parts are by weight unless otherwise indicated.

EXAMPLE 1

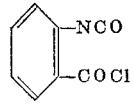

About 198 g. of 2-formylaminobenzoic acid methyl ester are introduced in several portions into a solution of about 155 g. of sulphuryl chloride in about 500 ml. of thionyl chloride in the course of about 30 minutes at about 20° C. Vigorous evolution of gas occurs and the temperature of the solution drops. The reaction mixture is stirred for a further 2 hours at room temperature, heated to the boiling point of thionyl chloride so that the thionyl chloride is evaporated in vacuo. About 114 g. of 2-chlorocarbonylphenylisocyanate of B.P.$_{10}$ 132–134° C. is obtained on vacuum distillation.

EXAMPLE 2

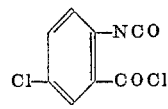

According to the procedure carried out in Example 1, except that 2-formylamino-4-chlorobenzoic acid methyl ester is used instead of 2-formylaminobenzoic acid methyl ester and in the same quantity 2-chlorocarbonyl-4-chlorophenylisocyanate of B.P.$_{25}$ 165–167° C. is obtained.

It is to be understood that any other suitable formylaminobenzoic acid alkyl ester or the like could be used in the foregoing examples provided that the teachings of this disclosure are followed. The examples are given for the purpose of illustration.

Although the invention has been described in considerable detail in the foregoing, it is to be understood that such detail is solely for the purpose of illustration and that many variations can be made by those skilled in the art without departing from the spirit and scope of the invention.

What is claimed is:
1. A process for the preparation of a 2-chlorocarbonyl isocyanate having the formula

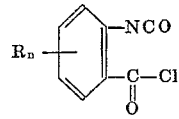

wherein $n$ is 0 to 4 and R is chlorine, bromine, fluorine, lower alkyl or lower alkoxy which comprises reacting the corresponding 2-formylaminobenzoic acid lower alkyl ester with a member selected from the group consisting of chlorine or sulphuryl chloride in thionyl chloride at a temperature of 0° C. to 50° C. followed by heating at a temperature of 100° C. to 200° C.

2. The process of claim 1 wherein 2-chlorocarbonyl isocyanate is prepared from 2-formylaminobenzoic acid methyl ester by reaction with sulphuryl chloride in thionyl chloride.

3. The process of claim 1 wherein 2-chlorocarbonyl-4-chlorophenyl isocyanate is prepared from 2-formylamino-4-chlorobenzoic acid methyl ester by reaction with sulphuryl chloride in thionyl chloride.

References Cited

FOREIGN PATENTS 752,105    7/1956    Great Britain.

OTHER REFERENCES

Iwakura et al.: J. Org. Chem., vol. 31, pp. 142–6 (Jan. 1966).

CHARLES B. PARKER, Primary Examiner

D. H. TORRENCE, Assistant Examiner

U.S. Cl. X.R.

71—92; 260—244, 260, 471, 518; 424—251